United States Patent [19]

Nagoshi et al.

[11] 4,013,608

[45] Mar. 22, 1977

[54] METHOD OF PRODUCING POLYMER SOLUTIONS OF POLYMERS OR COPOLYMERS OF VINYL CHLORIDE SERIES

[75] Inventors: Fumiya Nagoshi, Kobe; Hideyuki Arakawa, Akashi; Hayashi Uchino, Kobe; Mitsuru Echigoya, Kobe; Masaki Matsuo, Kobe, all of Japan

[73] Assignee: Kanegafuchi Kagaku Kogyo Kabushiki Kaisha, Osaka, Japan

[22] Filed: Mar. 3, 1975

[21] Appl. No.: 554,413

[30] Foreign Application Priority Data

Mar. 5, 1974 Japan .............................. 49-26000

[52] U.S. Cl. ..................... 260/32.6 N; 260/32.6 R; 260/79.3 M; 526/87; 526/220; 526/225; 526/296; 526/321; 526/328; 526/330; 526/342; 526/344

[51] Int. Cl.² ................... C08K 5/20; C08L 27/06; C08L 27/08; C08L 32/20

[58] Field of Search ............... 260/92.8 W, 92.8 A, 260/32.6 R, 29.6 TA, 29.6 SQ, 32.6 N; 526/225

[56] References Cited

UNITED STATES PATENTS

| | | | |
|---|---|---|---|
| 3,551,396 | 12/1970 | Lanthler | 260/92.8 W |
| 3,790,542 | 2/1974 | Koyanagi et al. | 260/92.8 W |
| 3,847,886 | 11/1974 | Blunt | 260/92.8 A |
| 3,883,494 | 5/1975 | Winter et al. | 260/92.8 W |

*Primary Examiner*—Allan Lieberman
*Attorney, Agent, or Firm*—Moonray Kojima

[57] ABSTRACT

A method of producing a polymer or copolymer solution of vinyl chloride series, wherein polymerization of 100 parts by weight of a monomer mixture of at least 50 weight percent of vinyl chloride and less than 50 weight percent of one or more monomers copolymerizable therewith is carried out in a solvent mixture consisting essentially of 30 to 55 weight percent water, remainder N,N-dimethyl formamide, in the presence of 0.5 to 5 parts by weight of a salt of a monomeric compound having a sulphonic acid group and using an initiator for radical polymerization.

15 Claims, No Drawings

METHOD OF PRODUCING POLYMER SOLUTIONS OF POLYMERS OR COPOLYMERS OF VINYL CHLORIDE SERIES

BACKGROUND OF THE INVENTION

The present invention relates to a method of producing a solution of a polymer or copolymer of vinyl chloride series and especially to a method of producing such polymer or copolymer solution in the preparation of having utility film or synthetic fiber.

In the prior art, there are known two methods for preparing a solution of vinyl chloride polymer. In one method, emulsion or suspension polymerization of vinyl chloride or a mixture of vinyl chloride and one or more monomers copolymerizable therewith is carried out in an aqueous medium and the obtained polymer is dissolved in an organic solvent. In the other method, solution polymerization of the foregoing monomers is carried out in an organic solvent which can dissolve the obtained polymer or copolymer.

In the first case, though there are many advantages, such as availability of proven techniques for emulsion and suspension polymerization, high polymerization velocity, high productivity, and ease of producing polymers of high molecular weight, etc, those methods are disadvantageous and labor consuming since it is necessary to employ such steps as salting out, dehydration, washing and drying to obtain a purified product. Moreover, it is necessary to dissolve the dried product in a solvent. Accordingly, the plant cost is high. Moreover, exhausting of the emulsifying agent raises the possibility of contamination of the waste water line.

In the latter method, although such disadvantages as mentioned above may not exist, since a polymer solution already prepared for spinning is obtained at the time when polymerization reaction is completed, unfortunately, the polymerization velocity in solution is very slow and the degree of polymerization of the obtained polymer is too low for various purposes such as those contemplated herein. When a single component polymerization or co-polymerization of vinyl chloride monomer is carried out in N,N-dimethyl formamide (hereinafter called "DMF," for sake of convenience), using usual initiators for free radical polymerization, ordinarily the polymerization velocity is very slow and the degree of polymerization of the obtained polymer is too low. This may be due to chain transferring ability of DMF.

Japanese Patent Publication 36-10996 disclosed a modified process for polymerizing acrylonitrile in which a mixture of water and an organic solvent is employed in place of organic solvent alone. However, this process when applied to polymerization of vinyl chloride or a monomer mixture having vinyl chloride as the predominant constituent meets with significant problems. When applied to a system having high monomer or monomers content, the polymer produced is deposited in a state of powder to form a dispersal phase and further polymerization becomes difficult to continue because the system is filled up with polymers of low bulk density at an early stage of polymerization. On the other hand, when applied to a system having low monomer content, the polymerization proceeds in a solution state and the polymerization proceeds very slowly. The obtained product is one having low degree of polymerization.

SUMMARY OF THE INVENTION

Accordingly, an object of the present invention is to overcome the aforementioned difficulties and disadvantages of the prior art.

The present invention provides an efficient method of producing a polymer solution of vinyl chloride series, having the advantages of the two polymerization methods mentioned above without the disadvantages thereof.

The foregoing and other objects are attained by this invention which encompasses a method of producing a polymer or copolymer of the vinyl chloride series, comprising the steps of polymerizing in at least one stage, 100 parts by weight of a monomer mixture consisting essentially of at least 50 weight percent vinyl chloride and less than 50 weight percent of one or more monomers copolymerizable therewith, in a solvent mixture consisting essentially of 30 to 55 weight percent water, remainder N,N-dimethyl formamide (DMF), and in the presence of 0.5 to 5 parts by weight of a salt of a monomeric compound having a sulphonic acid group and of an initiator for radical polymerization, and then after treating the resulting emulsion polymer. The monomer mixture should be from 10 to 40 weight percent of the total weight of solvent mixture and monomer mixture. The emulsion is treated by distilling off the unreacted components and water to leave a DMF solution of the polymer or copolymer. The polymer emulsion may also be treated with a cation exchange resin, if desired. In one embodiment, the vinyl chloride and/or one or more monomers copolymerizable therewith may be added during polymerization to control the ratio of vinyl chloride to said one or more monomers to be substantially constant. In another embodiment, the polymerization is in two stages with the vinyl chloride and/or one or more monomers being added in each of the two stages to control the percentage of vinyl chloride to be more than 90 weight percent and less than 10 weight percent one or more monomers in the first stage, and 50 to 85 weight percent vinyl chloride and 15 to 50 weight percent one or more monomers in the second stage. The advantages and surprizing results obtained by the invention are discussed in detail in the description given herein after.

A feature of the invention is the use of a solvent mixture of water and DMF in the range of water 30 to 70 weight percent, remainder DMF, in the polymerization of a mixture of monomers consisting essentially of at least 50 weight percent vinyl chloride and less than 50 weight percent one or more monomers copolymerizable therewith.

Another feature is the use of a salt of monomeric compound having a sulphonic acid group in an amount of 0.5 to 5 parts by weight to 100 parts by weight of the monomer mixture.

A further feature of the invention is the use of an initiator for radical polymerization.

A still further feature is the use of 10 to 40 weight percent and more preferably 20 to 35 weight percent of monomer mixture to the total weight of solvent and monomer mixture.

Another feature is the treatment of the emulsion polymer by distilling off the water and unreacted components or, if desired, the polymer emulsion may be treated with a cation exchange resin prior to distilling off the water and unreacted components.

Another feature is the selective control of the ratio of vinyl chloride to said one or more monomers copolymerizable therewith during polymerization by the addition of vinyl chloride and/or said one or more monomers.

Another feature is the use of two stages of polymerization with selective control of the percentage of vinyl chloride and said one or more monomers copolymerizable therewith in each stage.

A further feature is the use in the monomer mixture of at least 80 weight percent vinyl chloride and less than 20 weight percent acrylonitrile, and less than 15 weight percent of a vinyl or vinylidene monomer.

DETAILED DESCRIPTION OF PREFERRED EMBODIMENTS

In the polymerization of monomers of vinyl chloride series, as mentioned above, using solvent mixtures of DMF added with various amounts of water, two cases can be observed. One case is when the polymerization reaction system becomes a homogeneous solution. The other case is when the system becomes an emulsion state. This depends upon the mixing ratio of water to DMF. We have discovered that if the mixing ratio of water to DMF is more than 30/70 in terms of weight (hereinafter allreferences to parts and weights and ratios will be interms of weight), the polymerization reaction system becomes an emulsion state. What is intended by the reference to weight ratio of water to DMF is that the solvent mixture consists essentially, for example for 30/70, of 30 weight percent water and remainder (i.e. 70 weight percent) DMF. For convenience the term weight ratio of water/DMF will be used. Further investigation has shown that for the emulsion polymerization of the above mentioned monomer of vinyl chloride series, the weight ratio of water/DMF is preferably in the range of 30/70 to 55/45, especially 40/60 to 55/45. In those ranges, advantageously, polymerization proceeds smoothly in an emulsion state and polymer of high degree of polymerization can be obtained in a short period of time.

In case of the water in the mixed solvent being less than 30 weight percent with the remainder DMF, the polymerization reaction system becomes a homogeneous solution and the polymerization velocity is rather slow; and moreover, it is difficult to obtain a polymer of high degree of polymerization. Further, in case the water content in the mixed solvent is more than 55 weight percent, although the polymerization reaction system is retained in an emulsion state, since the polymerization reaction occurs so rapidly, it is difficult to retain the system in a stable emulsion state. Moreover, such a concentration of water in the solvent mixture is not desirable since the amount of gel-formation in the resulting polymer increases.

In the present invention, for the polymerization of monomeric mixture comprising over 50 weight percent vinyl chloride, the weight ratio range of water/DMF should be within the range mentioned above. For example, if polymerization of vinyl chloride series is carried out in a mixture of solvents in a weight ratio of water/DMF of 15/85, the concentration of monomer is very high, the generated polymer separates out from the solvent system in a pulverous state and disperses in the polymerization system. Moreover, with the progress of the polymerization reaction, but at not so high conversion rate of monomer, the reaction system fills up with the generated voluminous polymer of low apparent density, and accordingly agitation of the system becomes impossible to continue and thereafter the polymerization does not proceed smoothly.

The method of the present invention is very much suitable and effective when applied to a mixture of monomers containing vinyl chloride in a high concentration and smooth emulsion polymerization can be carried out even when the concentration of vinyl chloride is higher than 80 weight percent, for example. Such is a distinct advantage of the invention.

Thus, a monomer mixture comprising at least 50 weight percent vinyl chloride and less than 50 weight percent of one or more monomers copolymerizable therewith is used.

By distilling off the water contained in the obtained polymer emulsion, a DMF solution of polymer of vinyl chloride series can be obtained. In this process, of course, it is desired that the amount of water to be distilled off from the polymer emulsion be as small as possible. Thus, such conditions as the ratio of water/DMF and small amount of solvent mixture in the polymerization system are advantageous for removing the water from the system. Considering both conditions and moreover the property of the resulting polymer, the conditions for emulsion polymerization are thusly determined.

From the standpoint of carrying out polymerization smoothly in an emulsion state, sometimes it becomes necessary to change the ratio of water/DMF preferably to fit the kind of monomer which is used to copolymerize with vinyl chloride and also the amount used in the polymerization system. For example, when the content of vinyl chloride in the monomer mixture is more than 80 weight percent, such ratio of water/DMF as 30/70 to 50/50, and more preferably 40/60 to 50/50, can be used. However, in case the content of vinyl chloride is at the lower end, such as 50 weight percent, the weight ratio of water/DMF is preferably in the range of 40/60 to 55/45. This may be due to the behaviour of monomeric vinyl chloride itself as a kind of solvent to effect the stability of the emulsion generating in the polymerization.

Furthermore, in order to carry out the polymerization smoothly in an emulsion state, an ordinary surface active agent, such as alkyl benzene sulphonate, may be added to the reaction system comprising the monomer mixture and the solvent mixture of water and DMF in the ratio range above discussed. However, it is preferable to use a salt of a vinyl monomer having a sulphonic acid group. This kind of compound is not only effective to stabilize the emulsion state of the polymer system but also is effective to give good dyeability to the fiber obtained from the copolymer prepared in the reaction system. As the monomer having a sulphonic acid group, well known examples are, for example, alkali metal salts of vinyl sulphonic acid, methacrylic acid sulphopropyl ester, methallyl sulphonic acid and styrene sulphonic acid. These are used in an amount of 0.5 to 5.0 weight parts to 100 parts by weight of the monomer mixture of vinyl chloride and one or more monomers copolymerizable therewith, for the purpose mentioned above.

An initiator for polymerization may be added to the reaction system. An conventional initiator for free radical polymerization may be used. Examples are persulphates, organic peroxides and azo-compounds, etc. Furthermore, any suitable redox system, such as hydrogen peroxide, persulphate or organic peroxide combined with rongalite (formaldehyde-sodium sulphochelate), sodium sulphite or sodium hydrogen sulphite, is desirable.

In this case, a general procedure for polymerization is as follows. First, a mixture of solvents consisting essentially of water and DMF in the ratios above set forth, is charged into a reaction vessel and after degassing and atmospheric replacement with hydrogen, 100 parts by weight of a monomer mixture consisting essentially of at least 50 weight percent vinyl chloride and less than 50 weight percent one or more monomers copolymerizable therewith together with 0.5 part by weight of the above mentioned sulphonic acid compound are charged. Then, after the content is heated up to a prescribed temperature, the above initiator is added and polymerization commenced. The temperature of polymerization is preferably between 20° to 60° C, and more preferably between 30° to 50° C.

The polymerization reaction system, at first, is separated into two layers, an upper layer comprising the monomer mixture and a lower layer mainly comprising water and DMF. However, with the progress of polymerization under a given condition, the system begins to become cloudy and at last becomes an uniform emulsion state. The polymerization reaction proceeds rapidly and a polymer of high degree of polymerization can be obtained in a good yield within a short period of polymerization.

By distilling off the water and residual unreacted monomer contained in the polymer emulsion after polymerization, a spinning solution (dope) can be prepared directly.

In this method of polymerization, the one or more monomers which are copolymerizable with the vinyl chloride can be selected from the group consisting of acrylonitrile, methacrylonitrile, α-chloroacrylonitrile, vinylidene cyanide, acrylic acid and its alkyl ester, especially such alkyl ester having 1 to 4 carbon atoms, or its polyethylene oxide ester shown as $-(CH_2.CH_2-O)_n-CH_3$, wherein $n$ is 4 to 23, methacrylic acid and its ester, especially such alkyl ester having 1 to 4 carbon atoms, or its polyethylene oxide ester shown as $-(CH_2.CH_2-O)_n-CH_3$, wherein n is 4 to 23, vinyl acetate, itaconic acid, vinylidene chloride, vinyl bromide, etc.

In one embodiment of the present invention, the monomer mixture consists essentially of more than 80 weight percent vinyl chloride and less than 20 weight percent of acrylonitrile, and the emulsion polymerization reaction procedes rapidly and effectively under sufficient control to get a desired copolymer of vinyl chloride and acrylonitrile. Another embodiment of the invention is the copolymerization reaction of a monomer mixture consisting essentially of more than 50 weight percent vinyl chloride and less than 50 weight percent acrylonitrile and added with a monomer of the vinylidene series.

In another embodiment of the invention, the polymerization is carried out in two stages, wherein the composition of monomer mixture is changed at the end of the first stage. For example, in the first step polymerization may be carried out on a monomer mixture consisting essentially of more than 90 weight percent of vinyl chloride and less than 10 weight percent of acrylonitrile and at the second step, the polymerization may be continued with a different monomer mixture, such as consisting essentially of 85 to 50 weight percent vinyl chloride and 15 to 50 weight percent acrylonitrile. Applying this two stage polymerization, a polymer emulsion of high concentration in a stable state is obtained.

In the polymerization system including the water-DMF solvent mixture, if the concentration of monomer mixture is too high, it is difficult to maintain a stable emulsion state during polymerization. On the other hand, if the concentration is too low, from standpoint of production economy, such is not desirable. In the invention, it is preferred to have between 10 to 40 weight percent, and more desirably from 20 to 35 weight percent of mixture of monomers to the total weight of solvent mixture and monomer mixture.

When the unreacted monomer and the water contained in the polymer emulsion obtained by the polymerization are distilled off, a DMF solution of a polymer or copolymer of vinyl chloride series can be prepared directly at once. However, the solution often shows a turbid appearance and in some instances cannot be used, such as for coating or manufacturing fibers, since it may tend to create fish eyes in a coated film layer or choking of spinning nozzle and produce other undesirable effects, such as loss of transparency.

After extensive study on removal of such turbidity in the polymer emulsion, the inventors have discovered that treating the obtained polymer emulsion with a cation exchange resin has a surprising and outstanding effect to improve the coloring appearance of the polymer solution obtained from the polymer emulsion. Another important embodiment of the invention encompasses the treatment of the obtained emulsion polymer with the cation exchange resin.

Although any cation exchange resin on the market may be used without any special choice on the kind of cation exchange resin, a cation exchange resin of strong acid type is most effective. Furthermore, any procedure to contact the polymer emulsion with the ion exchange resin may be used. However, a method in which the polymer emulsion is passed down through a column packed with the cation exchange resin is simple, convenient and economical.

The inventive polymer emulsion can be smoothly treated with the cation exchange resin since the emulsion is stable and does not coagulate when contacted with the ion exchange resin during the treatment. Ordinarily, the pH value of the treated polymer emulsion decreases in an amount of 2 to 3 compared with that before the treatment.

Although the reason why the turbidity of the polymer emulsion after the polymerization can be reduced by such an ion exchange treatment is not yet entirely understood, it may be due to the fact that metallic ion belonging to a compound which is a component in the polymerization reaction and causing the turbid appearance of the polymer emulsion, is removed by exchange with hydrogen ion by the action of the ion exchange resin.

As above mentioned, an important effect of the ion exchange treatment is the removal of other coloring matters from the polymer emulsion. The DMF solution of a polymer of vinyl chloride series, obtained by the emulsion polymerization of the above process, sometimes contains a faint color, yellowish or reddish. Fortunately, the coloring appearance of the resulting polymer solution obtained after the ion exchange treatment is considerably improved as shown in the following examples.

Also, advantageously, after treatment and distilling off of unreacted components and water, a DMF solution of polymer can be obtained which is suitable for direct use as a spinning dope without possessing the above disadvantages of the spinning dope obtained without such ion exchange treatment.

The following actual examples are exemplary of the invention and are not to be construed in any limiting sense.

EXAMPLE 1

After charging 180 parts of a mixture of solvents having a weight ratio of water/DMF of 45/55, 100 parts of vinyl chloride, 1.5 parts of methallyl sulphonic acid sodium salt and 0.02 parts of concentrated sulphuric acid, into a glass reaction vessel of pressure-proof type, the entire mixture was heated up to 40° C and polymerization was carried out by adding ammonium persulphate and sodium hydrogen sulphite, separately (each of them being in 0.10 parts and dissolved separately in small amounts of water) under sufficient agitation.

The polymerization reaction system became an emulsion state after 15 minutes from the start of polymerization. After three hours, the polymerization reaction was stopped.

The polymer yield was 62% and the specific viscosity $\eta$ sp of the obtained polymer dissolved in cyclohexanone was 0.175 (0.2g of polymer per 100 cc of solution at 30° C).

EXAMPLE 2

After charging 360 parts of a mixture of solvents having a weight ratio of water/DMF of 45/55, 0.02 part of concentrated sulphuric acid, 85 parts of vinyl chloride, 15 parts of acrylonitrile and 1.5 parts of methacrylic acid sulphopropyl ester sodium salt, into a glass reaction vessel of pressure-proof type, the entire mixture was heated up to 40° C and polymerization started by adding ammonium persulphate and sodium hydrogen sulphite separately (each of them being in 0.05 parts dissolved separately in small amounts of water) under sufficient agitation. Soon thereafter, 45 parts of acrylonitrile and 0.35 parts of ammonium persulphate and 0.35 parts of sodium hydrogen sulphite (each dissolved in small amounts of water separately) were added continuously, taking 7 hours for the addition, under tight control in order to substantially maintain the weight ratio of vinyl chloride to acrylonitrile in the reaction system at a substantially constant value of 85/15. Thus, a uniform copolymer of vinyl chloride and acrylonitrile having the acrylonitrile unit in an amount of about 48 weight percent was prepared. The polymerization was stopped after 7 hours. The viscosity of the obtained emulsion was 15 cps at 25° C. The yield of polymer was 121 parts. From the observation of a sample of the obtained polymer, its molecular weight was estimated to be about 60,000.

The unreacted monomers, vinyl chloride and acrylonitrile, and water contained in the obtained emulsion polymer were distilled off using a rotary evaporator of 400 mm Hg of pressure, and a pale yellow and viscous polymer solution was obtained. The solution was adjusted to have the polymer at a concentration of 30 weight percent. The final polymer solution contained ca. 2 weight percent of water and had a viscosity of 40 cps at 40° C.

A synthetic fiber prepared from this solution by directly spinning same and stretching, had almost equal properties to modacrylic fibers on the market, in terms of non-transparency, anti-weathering property, dyeability and mechanical strength.

EXAMPLE 3

After charging 360 parts of a mixture of solvents having the ratio water to DMF of 45/55, 0.02 parts of concentrated sulphuric acid, 90 parts of vinyl chloride, 10 parts acrylonitrile and 2.5 parts of methacrylic acid sulphopropyl ester sodium salt, into a glass reaction vessel of the pressure proof type, the entire mixture was heated to about 40° C and polymerization reaction was started by adding 0.05 parts of ammonium sulphate and 0.05 parts of sodium hydrogen sulphite separately (each was previously dissolved in small amounts of water separately). Then, afterwards, a suitable amount of acrylonitrile was added continuously, in order to retain the weight ratio of vinyl chloride to acrylonitrile in the polymerization reaction system at a substantially constant value of 90/10. At the same time suitable amounts of ammonium persulphate and sodium hydrogen sulphite were separately and continuously added as before. The polymerization reaction was continued for 7 hours.

The obtained polymer emulsion was very stable and its viscosity was 17 cps at 25° C. The yield of polymer was 117 parts. Here, an uniform copolymer having 47 weight percent of acrylonitrile was obtained.

Treatment of the obtained polymer emulsion was carried out by passing the emulsion through a column packed with an ion exchange resin of strong acid type (Registered trademark "Diaion SK-IB, " manufactured by Mitsubishi Chemical Co., Ltd, which was changed from an Na-type to an H-type with hydrochloric acid) at usual temperature and then the contained water, etc, were distilled off from the polymer emulsion such as in example 2. A copolymer solution was thus prepared. The turbidity and yellow color of this solution were considerably decreased compared with those of a polymer solution which was prepared by only distilling off the contained water, etc, from the emulsion polymer as described above in example 2, without treatment with an ion exchange resin.

EXAMPLE 4

After charging 240 parts of a mixture of solvents having the ratio of water to DMF of 40/60, 0.02 parts of concentrated sulphuric acid, 90 parts of vinyl chloride, 10 parts of acrylonitrile and 2.7 parts of methacryl sulphonic acid sulphopropylester sodium salt, into a glass reaction vessel of the pressure proof type, the entire mixture was heated to 40° C and polymerization reaction was started by adding 0.05 parts of ammonium persulphate and 0.05 parts of ammonium hydrogen sulphite separately (each was previously dissolved in small amounts of water separately). Then, afterwards, acrylonitrile was continually added to the polymerization reaction system in order to keep the weight ratio of vinyl chloride to acrylonitrile in the reaction system at a substantially constant value of about 90/10. At the same time, suitable amounts of ammonium persulphate and ammonium hydrogen sulphite were continuously added separately as before. The polymerization reaction was carried out for 7 hours.

The obtained polymer emulsion was slightly viscous and very stable. The yield of polymer was 122 parts and a uniform copolymer of vinyl chloride and acrylonitrile, whose content of acrylonitrile was 45.5 weight percent, was obtained. A polymer solution was prepared, after treating the obtained polymer emulsion with the cation exchange resin of Example 3. The polymer solution was very clear and transparent without any turbidity, compared with a polymer solution which was prepared by only distilling off the contained water, unreacted components, etc., from the copolymer emulsion obtained above and without treatment with an ion exchange resin.

The yellow color of the solution was considerably reduced and the solution was suitable for direct use as a spinning dope.

EXAMPLE 5

After charging 180 parts of a mixture of solvents having a water to DMF ratio of 45/55, 80 parts of vinyl chloride, 20 parts of acrylonitrile, 2.7 parts of methacylic acid sulphopropyl ester sodium salt, 5 parts of vinylidene chloride and 0.02 parts of concentrated sulphuric acid, into a glass reaction vessel of the pressure proof type, the entire mixture was heated up to 40° C and polymerization reaction was carried out, adding 0.10 parts of ammonium persulphate and 0.10 parts of sodium hydrogen sulphite separately (each was previously dissolved in small amounts of water separately) under sufficient agitation.

The polymerization reaction system became an emulsion state soon after the start of polymerization. The polymerization reaction was continued for three hours. The obtained polymer was stable. Thus, an uniform copolymer containing acrylonitrile in an amount of 49 weight percent was obtained in a yield of 32 weight percent. The specific viscosity $\eta$ sp of the obtained polymer dissolved in DMF was 0.186 (0.2 g/100 ml of solution, at 30° C).

EXAMPLE 6

A series of copolymerization experiments of vinyl chloride and acrylonitrile was carried out in the same way as in Example 5, using the listed compounds, each in a definite amount as listed in Experiments No. 1 to No. 5 in the following table, as the component of the monomer having the sulphonic acid group.

Another series of copolymerization experiments of vinyl chloride and acrylonitrile was carried out in the same way as in Example 5, using the listed compounds having sulphonic acid group, each in a definite amount and moreover, using other various monomers copolymerizable with the vinyl chloride, each in a definite amount as listed in Experiments No. 6 to No. 15 in the following table.

In each case, a stable polymer emulsion was obtained.

| Exp. No. | Monomer Having Sulphonic Acid Group (Parts) | Other Monomer For Copolymerization (Parts) | Polymer Yield (%) |
|---|---|---|---|
| 1 | methacrylic acid sulphopropyl ester sodium salt (2.5) | — | 35 |
| 2 | methallyl sulphonic acid sodium salt (2.5) | — | 26 |
| 3 | allyl sulphonic acid sodium salt (2.5) | — | 16 |
| 4 | n-ethyl sulphoethyl acrylic acid amide sodium salt (2.5) | — | 20 |
| 5 | styrene sulphonic acid sodium salt (2.5) | — | 28 |
| 6 | methacrylic acid sulphopropyl ester sodium salt (2.5) | vinylidene chloride (5) | 32 |
| 7 | methallyl sulphonic acid sodium salt (2.5) | Vinylidene chloride (5) | 21 |
| 8 | methacrylic acid sulphopropyl ester sodium salt (2.5) | Vinyl acetate (5) | 26 |
| 9 | methallyl sulphonic acid sodium salt (2.5) | Vinyl acetate (5) | 17 |
| 10 | methallyl sulphonic acid sodium salt (2.5) | acrylic acid methyl ester (5) | 24 |
| 11 | methallyl sulphonic acid sodium salt (2.5) | methacrylic acid methyl ester (5) | 45 |
| 12 | methallyl sulphonic acid sodium salt (2.5) | acrylic acid (5) | 16 |
| 13 | methacrylic acid sulphopropyl ester sodium salt (2.5) | vinyl bromide (5) | 25 |
| 14 | methacrylic acid sulphopropyl ester sodium salt (2.5) | methacrylic acid polyethylene glycol ester* (5) | 22 |
| 15 | methacrylic acid sulphopropyl ester sodium salt (2.5) | methacyclic acid polyethylene glycol ester** (5) | 30 |

Note:
$$*-\underset{\underset{O}{\|}}{C}-O-(CH_2-CH_2O)_n-CH_3, \quad \bar{n}=4$$

$$**-\underset{\underset{O}{\|}}{C}-O-(CH_2-CH_2O)_n-CH_3, \quad \bar{n}=9$$

EXAMPLE 7

After charging 360 parts of a mixture of solvents having the ratio of water to DMF of 45/55, 0.02 parts of concentrated sulphuric acid, 80 parts of vinyl chloride, 20 parts of acrylonitrile, 2.5 parts of methacrylic acid sulphopropyl ester sodium salt and 4 parts of vinylidene chloride, into a glass reaction vessel of the pressure-proof type, the entire mixture was heated up to 40° C and polymerization was started by adding 0.05 parts of ammonium persulphate and 0.05 sodium hydrogen sulphite separately (each was previously dissolved in small amounts of water separately). Then, afterwards, a mixture of monomers consisting of 50 parts of acrylonitrile and 4 parts of vinylidene chloride and 0.30 parts of ammonium persulphate and 0.30 parts of sodium hydrogen sulphite (each was previously dissolved in small amounts of water separately) were added continuously, taking 7 hours to complete adding, under suitable control, in order to retain the weight ratio of vinyl chloride monomer to acrylonitrile substantially constant at 80/20 in the polymerization reaction system. Thus, a uniform copolymer of vinyl chloride, acrylonitrile and vinylidene chloride having a acrylonitrile content of about 54 weight percent, was obtained. The polymerization was stopped after 7 hours. The obtained polymer emulsion was stable and had a viscosity of 19 cps at 25° C. The yield of polymer was 126 parts. A small portion of same was taken out and the viscosity of the DMF solution was observed as $\eta$ sp = 0.210 at 30° C (the concentration was 0.2 g/100 cc)

A viscous and pale yellow polymer solution was obtained. Thereafter there was distilled off, as in example 2, the unreacted vinyl chloride, acrylonitrile and vinylidene chloride and water contained in the polymer emulsion.

The polymer solution was suitable for use as a spinning dope.

Example 8

After charging 330 parts of a mixture of solvents having the ratio of water to DMF of 42/58, 0.005 parts of concentrated sulphuric acid, 60 parts of vinyl chloride, 15 parts of vinylidene chloride, 25 parts of acrylonitrile and 3 parts of methacrylic acid sulphopropyl ester sodium salt, into a glass polymerization vessel of the pressure proof type, the entire mixture was heated to 40° C and polymerization was started by adding 0.10 parts of ammonium persulphate and 0.10 parts of sodium hydrogen sulphite (each was previously dissolved in small amounts of water separately). Then, afterwards, suitable amounts of acrylonitrile and vinylidene chloride were continuously added to the polymerization reaction system in order to substantially retain the monomeric composition of the reaction system at a substantially constant value. At the same time, adding continuously a small amount of ammonium persulphate and also a small amount of sodium hydrogen sulphite separately, the polymerization was continued for 5 hours. Here, a three component copolymer of 25 weight percent vinyl chloride, 28 weight percent vinylidene chloride and 51 weight percent acrylonitrile, was obtained in an amount of 114 parts by weight.

EXAMPLE 9

After charging 180 parts of a mixture of solvents having the ratio of water to DMF of 45/55, 95 parts of vinyl chloride, 5 parts of acrylonitrile, 2.0 parts of methacrylic acid sulphopropyl ester sodium salt and 0.03 parts of concentrated sulphuric acid, into a glass polymerization reaction vessel of the pressure proof type the entire mixture was heated up to 40° C and then polymerization reaction was started by adding 0.10 parts of ammonium sulphate and 0.10 parts of sodium hydrogen sulphite separately (each was previously dissolved in small amounts of water separately), and mixing suitably. Soon thereafter, the reaction system became an emulsion state. After 2 hours, the reaction system was cooled down to room temperature to stop the polymerization reaction, once. The obtained polymer emulsion was somewhat viscous and stable. The yield of polymer was 31 parts, therefore, the concentration of polymer in the polymer emulsion was 14.7 percent by weight and the content of the unreacted acrylonitrile in it was 17 percent by weight.

The unreacted vinyl chloride in the emulsion was expelled, and 30 parts of vinyl chloride and 20 parts of acrylonitrile were charged into the system again. This newly prepared reaction system was heated up again to 40° C and the second step of polymerization was carried out by adding 0.05 parts of ammonium persulphate and 0.05 parts of sodium hydrogen sulphite separately, (each was previously dissolved in small amounts of water separately). Although the polymer emulsion became more viscous, the polymerization reaction proceeded smoothly. The polymerization reaction was stopped after 2 hours. The yield of polymer was 69 parts and accordingly, the polymer concentration in the obtained polymer emulsion, after removing the unreacted vinyl chloride was about 25 weight percent. The acrylonitrile content in the obtained polymer was 40 weight percent in the mean value.

Thus, a mixture of two kinds of copolymers, one containing the acryonitrile in an amount of 17 weight percent and the other estimated to contain acrylonitrile component of about 60 weight percent, was prepared.

The foregoing description is for purposes of illustrating the principles of the invention. Numerous other variations and modifications thereof would be evident to the worker skilled in the art. All such modifications and variations are to be considered to be within the spirit and scope of the invention.

What is claimed is:

1. A method of producing solutions of polymers or copolymers of vinyl chloride series, comprising the steps of polymerizing in at least one step in a solvent mixture consisting essentially of 30 to 55 weight percent water, remainder N,N-dimethyl formamide, 100 parts by weight of a monomer mixture comprising at least 50 weight percent of vinyl chloride and less than 50 weight percent one or more monomers copolymerizable therewith, in the presence of 0.5 to 5.0 parts by weight of a surface active agent of a salt of monomeric compound having a sulphonic acid group selected from the group consisting of alkali metal salts of vinyl sulphonic acid, methacrylic acid sulphopropyl ester, methallyl sulphonic acid and styrene sulphonic acid and using an initiator for radical polymerization, and at a temperature of between 20° to 60° C, and after treating the resulting emulsion by at least distilling water and unreacted monomers from the resulting emulsion, and wherein said monomer mixture is 10 to 40 weight percent of the total weight of said solvent mixture and said monomer mixture.

2. The method of claim 1, wherein said monomer mixture comprises more than 80 weight percent vinyl chloride and less than 20 weight percent said one or more monomers copolymerizable therewith.

3. The method of claim 1, wherein said one or more monomers copolymerizable with said vinyl chloride is selected from the group consisting of acrylonitrile, methacrylonitrile, α-chloroacrylonitrile, vinylidene cyanide, acrylic acid and its alkyl esters, polyethylene oxide esters of acrylic acid, methacrylic acid and its esters, polyethylene oxide esters of methacrylic acid, vinyl acetate, itaconic acid, vinylidene chloride, vinyl bromide.

4. The method of claim 2, wherein said solvent mixture consists essentially of 30 to 50 weight percent water, remainder N,N-dimethyl formamide.

5. The method of claim 4, wherein said solvent mixture consists essentially of 40 to 50 weight percent water, remainder N,N-dimethyl formamide.

6. The method of claim 1, wherein 50 weight percent vinyl chloride is used, and said solvent mixture consists essentially of 40 to 55 weight percent water, remainder N,N-dimethyl formamide.

7. The method of claim 3, wherein said one or more monomer is acrylonitrile.

8. The method of claim 1, wherein said polymerization temperature is between 30° to 50° C.

9. The method of claim 1, wherein said one or more monomers is a mixture of acrylonitrile and a monomer of the vinylidene series.

10. The method of claim 1, wherein said resulting emulsion is treated with a cation exchange resin of the strong acid type prior to distilling water and unreacted monomers from said resulting emulsion.

11. The method of claim 1, wherein said monomer mixture comprises more than 80 weight percent vinyl chloride and less than 20 weight percent acrylonitrile, and during polymerization adding more than one part by weight of vinyl chloride and/or acrylonitrile to said reaction system to substantially retain the foregoing ratio of said vinyl chloride to said acrylontrile.

12. The method of claim 1, wherein vinyl chloride and/or said one or more monomers is added during polymerization to substantially keep the ratio between said vinyl chloride and said one or more monomers at a constant value.

13. The method of claim 1, wherein said monomer mixture comprises more than 50 weight percent vinyl chloride and less than 50 weight percent acrylonitrile and less than 15 weight percent vinylidene chloride.

14. The method of claim 1, wherein said polymerization is carried out in two stages, with suitable amounts of vinyl chloride and said one or more monomers copolymerizable therewith being added to substantially retain the ratio of 90 weight percent vinyl chloride and 10 weight percent said one or more monomers in the first stage, and with suitable amounts of vinyl chloride and said one or more monomers being added to substantially retain the ratio of 85 to 50 weight percent vinyl chloride and 15 to 50 weight percent said one or more monomers in the second stage.

15. The method of claim 1, wherein said monomer mixture is 20 to 35 weight percent of the solvent mixture and monomer mixture weight.

* * * * *